Dec. 13, 1955 P. V. McCLELLAN 2,726,554
SAFETY DRIVING BRAKE
Filed Aug. 31, 1951 2 Sheets-Sheet 1

INVENTOR
PAUL V. McCLELLAN,

BY
McMorrow, Berman & Davidson
ATTORNEYS

Dec. 13, 1955 — P. V. McCLELLAN — 2,726,554
SAFETY DRIVING BRAKE
Filed Aug. 31, 1951 — 2 Sheets-Sheet 2
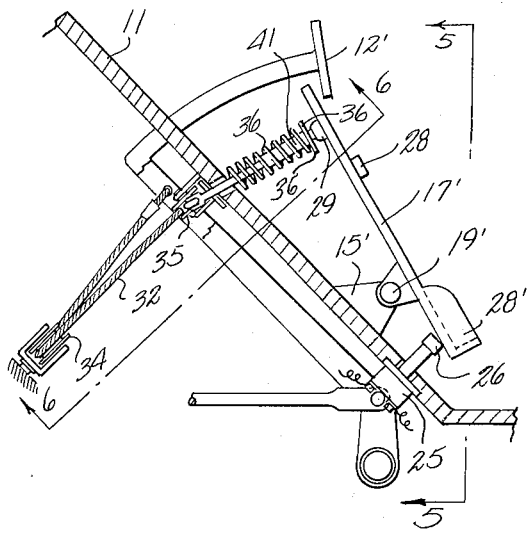
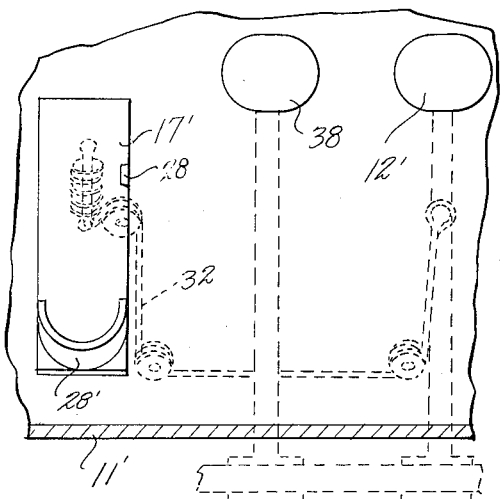
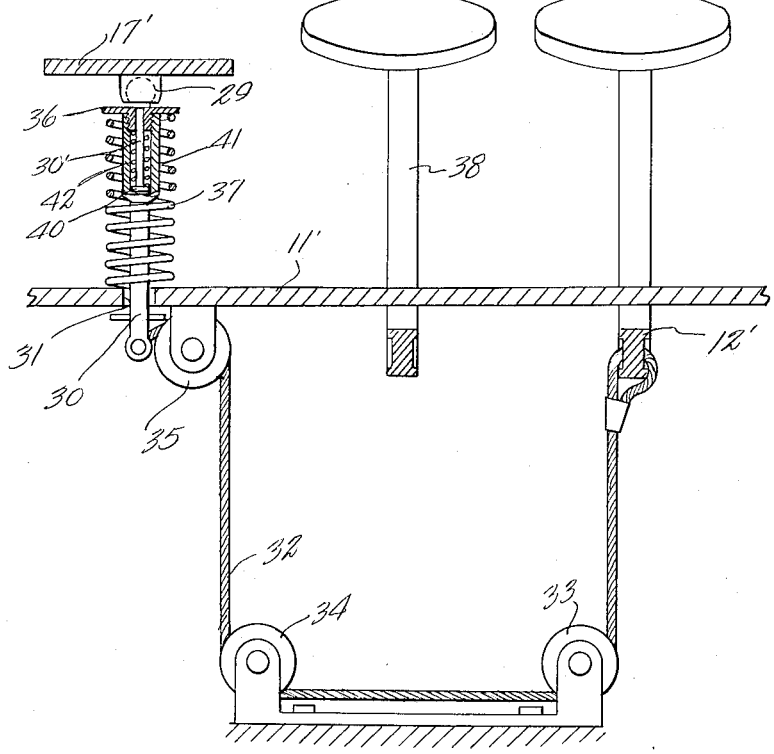
INVENTOR
PAUL V. McCLELLAN,
BY McMorrow, Berman & Davidson
ATTORNEYS

United States Patent Office 2,726,554
Patented Dec. 13, 1955

2,726,554

SAFETY DRIVING BRAKE

Paul V. McClellan, Waukegan, Ill.

Application August 31, 1951, Serial No. 244,595

2 Claims. (Cl. 74—562.5)

This invention relates to motor vehicle brakes, and more particularly to an auxiliary brake pedal enabling the driver of a vehicle to apply the brakes with his left foot if so required.

A main object of the invention is to provide a novel and improved auxiliary brake pedal for motor vehicles which is simple in construction, which is easy to install, and which enables the driver of the vehicle equipped therewith to apply the brakes with his left foot, whereby the driver need not remove his right foot from the accelerator pedal.

A further object of the invention is to provide an improved combination auxiliary brake pedal and dimmer switch operating means for a motor vehicle which involves inexpensive components, which is sturdy in construction, which provides improved control of the vehicle on which it is installed, and which increases the safety and maneuverability of the vehicle, at the same time reducing the amount of effort required on the part of the driver to keep the vehicle under control.

Further objects and advantages of the invention will become apparent from the following description and claims, and from the accompanying drawings, wherein:

Figure 4 is a view similar to Figure 1, but showing a modified form of the present invention;

Figure 5 is a view taken on line 5—5 of Figure 4;

Figure 6 is an enlarged cross-sectional view taken on line 6—6 of Figure 4;

Figure 1:
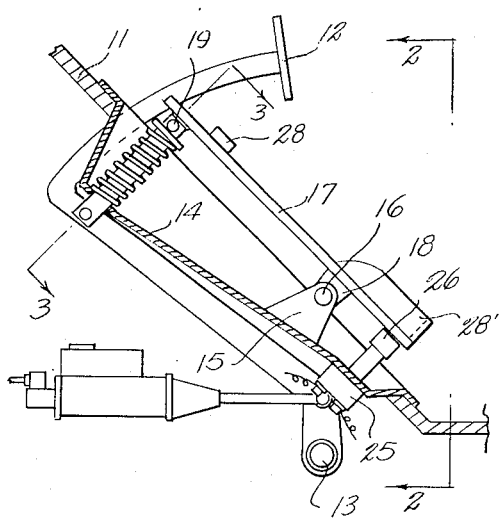
Figure 1 is a vertical longitudinal cross-sectional view taken through a section of the floorboard of a vehicle and through an improved auxiliary brake pedal according to the present invention.

Referring to the drawings, 11 designates the floorboard of a motor vehicle, and 12 designates the conventional brake pedal pivoted to the frame of the vehicle at 13. Designated at 14 is a downwardly dished bracket plate which is secured in a recess formed in the floorboard 11 at a distance spaced to the left of the brake pedal 12, such that the driver may place his left foot conveniently over the bracket plate 14. The bracket plate 14 is formed with a pair of spaced upstanding lugs 15, 15 connected at their top ends by a transverse shaft 16. Designated at 17 is an auxiliary pedal having a depending transverse rib 18 through which the shaft 16 rotatably extends, the pedal being rotatable around said shaft.

Designated at 22 is a transversely extending horizontal rod which is rigidly connected to the brake pedal 12 below the floorboard 11. Rod 22 is formed at its end portion with an arm 23 which extends slidably through the bracket plate 14. Pivotally connected at 19 to the forward end of the auxiliary pedal 17 is a depending shouldered plunger rod 20 having a head 20'. Arm 23 is formed with a bore 23' slidably receiving head 20', the shank of rod 20 passing slidably through a flanged bushing 21 threadedly secured in the end of arm 23. Surrounding said shank and bearing between head 20' and bushing 21 is a coiled spring 24' which biases the rod 20 downwardly into bore 23'. Surrounding the arm 23 is a coiled spring 24 bearing at one end on the bottom wall of the bracket plate 14 and bearing at its other end on the flange of bushing 21, biasing the auxiliary brake pedal 17 upwardly relative to the bracket plate 14.

Secured to the rear portion of the bracket plate 14 subadjacent the rear end of the brake pedal 17 is a conventional dimmer switch 25 having the upstanding actuating plunger 26 located beneath the rear end of the pedal 17.

It will be noted that the springs 24 and 24' maintain the auxiliary pedal 17 in a neutral position, and that when the lever 17 is rotated clockwise, as viewed in Figure 1, the plunger 26 will be depressed, causing the dimmer switch to be actuated, whereas, when the lever 17 is rotated counterclockwise, as viewed in Figure 1, the rod 20 moves the arm 23 downwardly and transmits downward motion to the main brake pedal 12 through the rod 22, causing said main brake pedal to be depressed, and thereby causing the vehicle brakes to be applied. It will therefore be apparent that the operator of the vehicle may cause the brakes to be applied by exerting downward force on the forward end of the auxiliary pedal 17 with his left foot, whereby his right foot may remain engaged with the accelerator pedal of the vehicle. This facilitates maneuvering the vehicle in traffic and controlling the vehicle on slopes, as where the vehicle is required to be started on an upward slope, and similar conditions wherein the driver ordinarily is required to move his right foot from the brake pedal to the accelerator several times to maintain proper control of the vehicle. It will also be readily apparent that the dimmer switch 25 may be actuated by merely pivoting the pedal 17 counterclockwise, as viewed in Figure 1, employing the heel of the left foot. An upstanding lug 28 is provided on the side margin of the pedal 17 facing the main brake pedal 12 to act as a guide means for the driver's left foot when it is placed on the pedal 17 and to prevent the driver's left foot from slipping off the pedal. The rear portion of pedal 17 is provided with the upstanding peripheral flange 28' to retain the operator's heel on the pedal.

It will be further apparent that the main brake pedal 12 may be operated in the usual manner by the driver's right foot without interference from the auxiliary pedal and its associated mechanism, since the arm 23 may slide substantially freely with respect to the depending rod 20. To prevent binding, the pivotal connection at 19 is relatively loose, and the rod 20 has a relatively loose fit inside the bushing 21.

Figure 2:
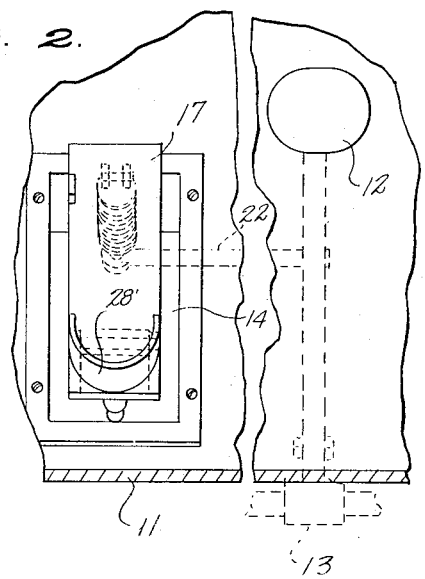
Figure 2 is a cross-sectional view taken on the line 2—2 of Figure 1.
Figure 7:
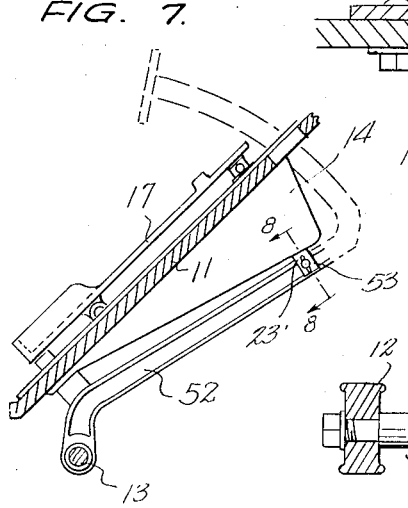
Figure 7 is a vertical longitudinal cross-sectional view taken through a portion of a vehicle floorboard adjacent an improved auxiliary brake pedal according to Figures 1 to 3, shown in side elevation, and illustrating how the regular brake pedal may be omitted, enabling the brakes to be operated solely by the auxiliary brake pedal.
Figure 3:
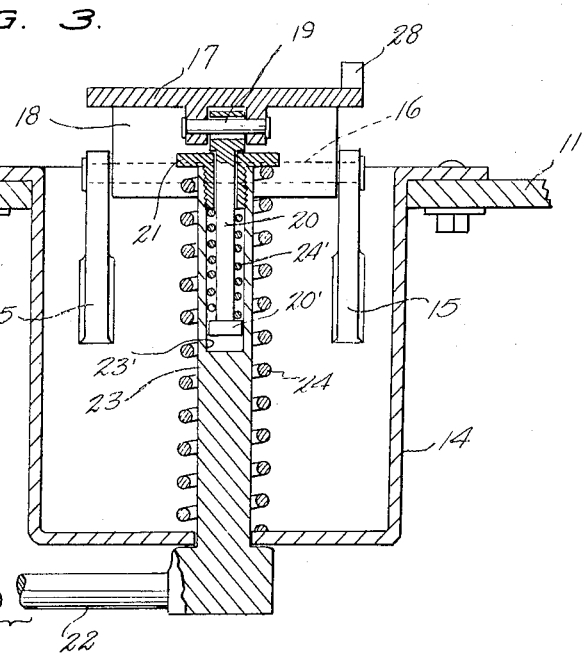
Figure 3 is an enlarged cross-sectional detail view taken on the line 3—3 of Figure 1.
Figure 8:
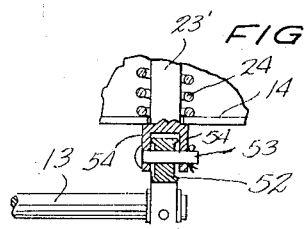
Figure 8 is an enlarged cross-sectional detail view taken on line 8—8 of Figure 7.

As shown in Figures 7 and 8, the main brake pedal may be omitted, and instead an arm 52 may be employed connecting the arm 23 to the brake-operating shaft. As shown in Figure 8, arm 52 is pivotally connected to the lower end of arm 23 by a pin 53. Arm 23 is identical with the arm 23 of Figures 1 to 3, except that its lower end is formed with the parallel depending lugs 54, 54 between which the end of arm 52 is pivotally connected.

In the modified form of the invention shown in Figures 4, 5 and 6, the floorboard is designated at 11' and the main brake pedal is designated at 12'. The auxiliary brake pedal is designated at 17' and is pivoted at 19' to the frame of the vehicle through the floorboard 11', and an upstanding lug 15' thereon. Secured to the floorboard 11' beneath the rear end of the pedal 17' is a conventional dimmer switch 25 having the plunger 26 engageable by the rear end of the pedal 17' when the pedal is rotated clockwise, as viewed in Figure 4.

Pivotally connected to the forward end of the auxiliary brake pedal 17', as by a ball-and-socket joint 29, is a shouldered depending rod 30' having a head 40. Designated at 30 is an arm extending through an opening 31 in the floorboard 11'. At its upper end, arm 31 is formed with a sleeve portion 41 which slidably receives the head 40, the shank of rod 30' extending slidably through a flanged bushing 36 threadedly secured in the end of sleeve portion 41. A coil spring 42 surrounds said shank and bears between head 40 and bushing 36, biasing rod 30' downwardly in sleeve portion 41. A coil spring 37 surrounds arm 30 and bears between floorboard 11' and the flange on bushing 36, biasing the forward end of pedal 17' upwardly. Designated at 32 is a cable connecting the end of arm 30 to the intermediate portion of the main brake pedal 12', said cable extending around a pair of pulleys 33 and 34 journaled to the vehicle frame beneath the floorboard 11' and passing around a pulley 35 journaled to the bottom surface of the floorboard 11' adjacent the rod 30, as shown in Figure 6. As in the previous embodiment of the invention, the auxiliary brake pedal is located a distance to the left of the main brake pedal providing convenient access to the auxiliary pedal 17' by the left foot of the operator of the vehicle, as for example, located a short distance to the left of the clutch pedal of the vehicle, shown at 38.

It will be apparent that when the pedal 17' is depressed at its forward end, the arm 30 exerts downward tension on the end of the cable 32 and causes the main brake pedal 12' to be depressed. When the auxiliary pedal 17' is released, the springs 37 and 42 maintain said auxiliary pedal in a neutral position. In this position, the main brake pedal 12' may be freely depressed without any interference with the auxiliary pedal 17', since the cable 32 allows the pedal 12' to be freely depressed. As in the previous form of the invention, the dimmer switch 26 may be actuated by rotating the pedal 17' clockwise, as viewed in Figure 4, as by exerting downward force with the heel of the left foot, causing the rear end of the auxiliary pedal to be depressed into engagement with the plunger 26 of the dimmer switch.

While certain specific embodiments of an improved auxiliary brake pedal for motor vehicles have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle, a main brake pedal pivoted to the frame of the vehicle, a bracket member secured to said frame in laterally spaced relation to said main brake pedal, a sleeve member extending slidably through said bracket member, an arm rigidly connecting said sleeve member to said main brake pedal, an auxiliary pedal pivoted to said bracket member, a depending rod pivoted to said auxiliary pedal and telescopically received in said sleeve member, and spring means biasing said auxiliary pedal upwardly relative to said bracket member, whereby the main pedal is depressed responsive to the depression of the auxiliary pedal.

2. In a motor vehicle, a main brake pedal pivoted to the frame of the vehicle, a bracket member secured to said frame in laterally spaced relation to said main brake pedal, a sleeve member extending slidably through said bracket member, an arm rigidly connecting said sleeve member to said main brake pedal, an auxiliary pedal pivoted to said bracket member, a depending rod pivoted to said auxiliary pedal and telescopically received in said sleeve member, spring means biasing said auxiliary pedal upwardly relative to said bracket member, whereby the main pedal is depressed responsive to the depression of the auxiliary pedal, a rearwardly extending element on said auxiliary pedal, and a dimmer switch mounted on said bracket member beneath said element and arranged for actuation responsive to downward engagement thereof by said element.

References Cited in the file of this patent

UNITED STATES PATENTS

| | | |
|---|---|---|
| 1,461,380 | Cole | July 10, 1923 |
| 1,662,092 | Warhus | Mar. 13, 1928 |
| 1,923,173 | Stewart et al. | Aug. 22, 1933 |
| 2,033,433 | Leupold | Mar. 10, 1936 |
| 2,078,390 | Kumpf | Apr. 27, 1937 |
| 2,239,439 | Crannell | Apr. 22, 1941 |
| 2,293,409 | Smith | Aug. 18, 1942 |
| 2,302,436 | Felton | Nov. 17, 1942 |
| 2,536,854 | Parker | Jan. 2, 1951 |
| 2,572,404 | Stoltenberg | Oct. 23, 1951 |
| 2,604,962 | Tibbetts | July 29, 1952 |

OTHER REFERENCES

Traffic Eng. and Safety Dept., AAA "Instructions for Installing 1949 Pontiac Dual Controls," September 8, 1950.